United States Patent [19]

Lloyd et al.

[11] Patent Number: 6,127,802
[45] Date of Patent: Oct. 3, 2000

[54] CHARGER WITH BATTERY RETENTION DOOR

[75] Inventors: Grant Harries Lloyd, Lawrenceville; Willard Francis Amero, Jr., Flowery Branch, both of Ga.

[73] Assignee: Motorola, Inc., Schaumburg, Ill.

[21] Appl. No.: 09/443,714

[22] Filed: Nov. 19, 1999

[51] Int. Cl.[7] .............................. H02J 7/00; H01R 13/62; H01M 2/10
[52] U.S. Cl. ..................... 320/113; 320/107; 439/298; D13/107; 429/97
[58] Field of Search ...................... 320/107, 113; 439/298, 366, 367; D13/103, 107, 108; 429/99, 100

[56] References Cited

U.S. PATENT DOCUMENTS

| | | | |
|---|---|---|---|
| 3,881,961 | 5/1975 | Nation | 429/97 |
| 5,394,073 | 2/1995 | Nagai | 320/2 |
| 5,604,050 | 2/1997 | Brunette et al. | 429/97 |
| 5,656,914 | 8/1997 | Negele et al. | 320/110 |
| 5,691,618 | 11/1997 | Kobayashi et al. | 320/115 |
| 5,851,692 | 12/1998 | Potts | 429/100 |
| 5,856,038 | 1/1999 | Mason | 429/97 |
| 5,910,380 | 6/1999 | Taraboulos et al. | 429/100 |
| 6,002,236 | 12/1999 | Trant et al. | 320/114 |
| 6,049,192 | 4/2000 | Kfoury et al. | 320/113 |

*Primary Examiner*—Peter S. Wong
*Assistant Examiner*—Gregory J. Toatley, Jr.
*Attorney, Agent, or Firm*—Philip H. Burrus, IV

[57] ABSTRACT

This invention is a battery charger having a pocket for charging a battery. The pocket is covered by a door which has a battery retention latch. When the door is open, and a battery is inserted into the pocket, the battery retention latch of the door exerts force upon the battery in a direction towards the charging contacts located in the base of the pocket. In so doing the door and battery retention latch hold the battery against the charging contacts, thereby enduring a good electrical connection. The battery retention latch also has a convex detente which keeps the door closed when no battery is present. Additionally, the charger may have a pocket for charging a phone and battery combination as well.

11 Claims, 4 Drawing Sheets ized battery. As rechargeable batteries can be charged
CHARGER WITH BATTERY RETENTION DOOR

TECHNICAL FIELD

The present invention relates to a charger for charging a rechargeable battery. More particularly, this invention relates to a compact battery charger with a battery retention mechanism for securing a battery therein.

BACKGROUND

Portable electronic devices are becoming more and more prevalent. Cellular phones, portable radios, pagers, personal organizers, and the like have become mainstays in everyday life. These and other similar devices rely on batteries for their portability. The cost of replacing single use batteries, like alkaline, can be prohibitive. In an effort to save consumer's money, electronics manufacturers are designing products which incorporate rechargeable batteries instead of single use cells. As rechargeable batteries can be charged and discharged thousands of times before replacement is needed, the overall cost of operating a rechargeable device becomes much cheaper.

One reason for the growing popularity of portable electronic devices is that both the size and cost of such devices are both being reduced. In the world of cellular phones, for example, the V-series phone manufactured by Motorola is less than three inches long when folded, and weighs less than 2.8 ounces! As the portable electronic devices get smaller and lighter, so too must the battery. In the case of the V-series phone, the battery measures 1.4"×1.96"×0.28", and weighs less than one ounce.

Chargers for portable devices, including cellular phones, tend to be able to recharge the battery in one of two ways: The first method is to insert the phone, with the battery attached, into a pocket in the charger. The second method is to detach the battery and insert it into the charger without the phone. The second method is primarily for people who own more than one battery. They can use one in the phone and have a spare charging in the charger.

The batteries themselves, without the phone attached, must make good contact with the charging terminals in order to charge. For this reason, batteries must be placed in a horizontal position and some type of latch must "push" the battery against the contacts to ensure a good connection. If a charger for these lightweight batteries was designed such that the battery stood vertically on end, the gravitational force pulling the battery down would not be strong enough to ensure a proper connection with the charger contacts. In other words, some batteries are so small and light, they can not go in a charger vertically, because they may not make a good connection with the charging contacts. They must instead be "snapped" into a charger horizontally to ensure a good connection.

The problem with this approach, i.e. snapping the battery in horizontally, is that a charger engineer must design the charger to be at least as long as the battery. Long chargers are bulky and unwieldy to carry around. There is therefore a need for a novel means of supporting a battery in a charger which allows designers to make the charger smaller.

DETAILED DESCRIPTION OF THE INVENTION

Figure 4:
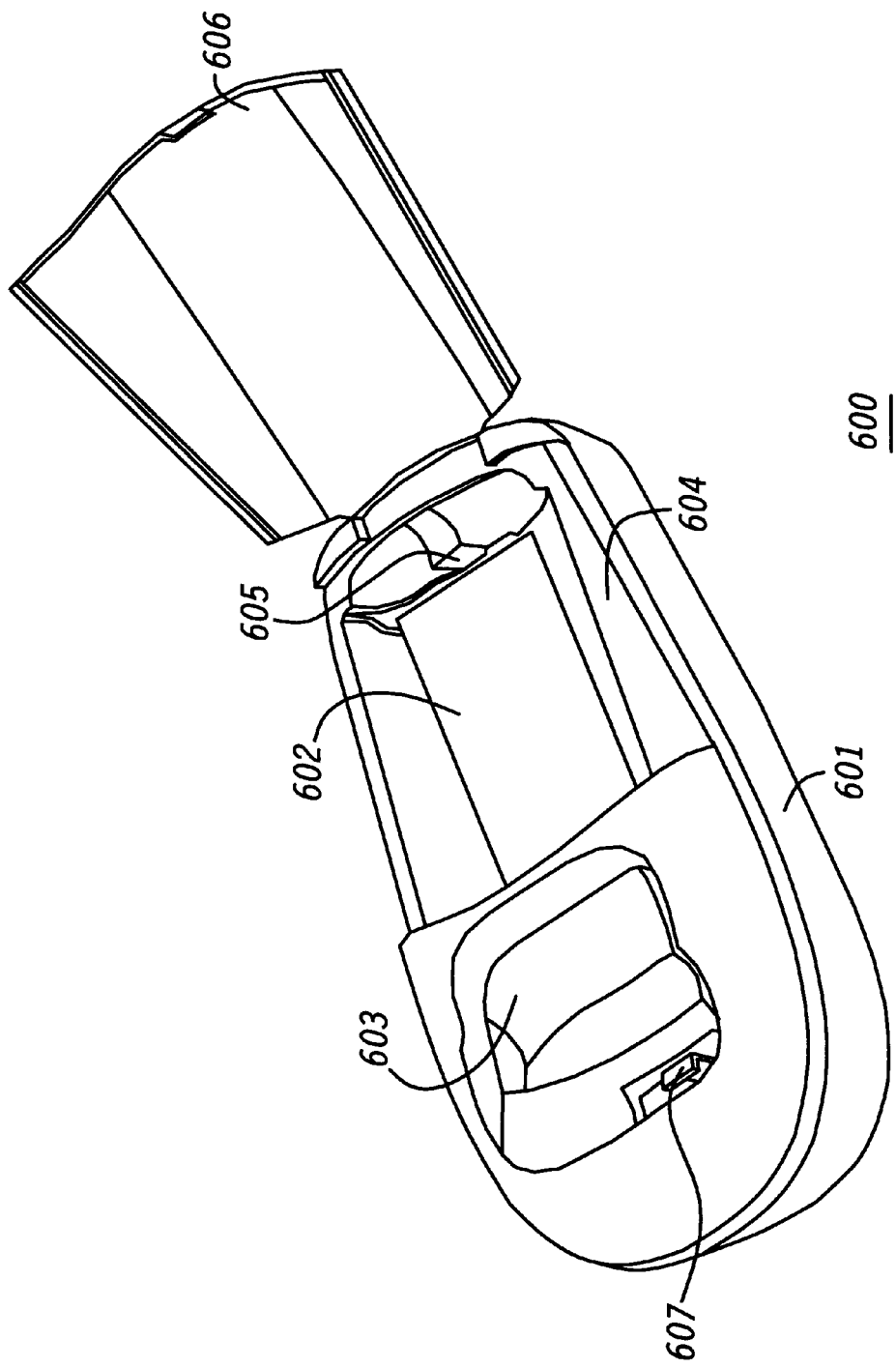
FIG. 4 is a prior art charger with a battery in a horizontal position.

Referring now to FIG. 4, illustrated therein is a prior art charging system 600 consisting of a charger 601 with a battery 602 inserted therein. The charger 601 has a front pocket 603 with a terminal 607 for charging a phone and battery combination, and a rear pocket 604 for charging a battery 602 by itself. In this charger, a door 606 is included which, when shut, covers the rear pocket 604.

In this prior art charging system 600, it can be seen that the battery 602 rests in the charger 601 in a horizontal position. This is so because, if the battery 602 were to stand in a vertical position, it would not have enough weight to ensure solid contact with the charger 601. Thus, the battery 602 is held in place by a rear wall 605 located in the rear pocket 604. The primary drawback to this "horizontal mounting" is that the rear pocket 604, and thus the charger 601, must both be longer than the battery cell 602, as can be seen in FIG. 6.

The present invention is a battery charging system, which includes a front pocket for charging a phone and battery combination, and a rear pocket for charging a battery independently. The charger has a door which covers the rear pocket. The door has a latch which serves two functions: First, the latch keeps the door closed when there is no battery in the rear pocket. Second, when the door is open, the latch acts as a retaining mechanism which mechanically pushes the battery against the charging terminals. In other words, the latch on the door acts as a virtual "thumb" and presses the battery into the rear pocket to ensure proper charging. The advantage of the present invention, including the multifunctional latch, is that the charger can now be designed with a smaller overall shape.

Figure 1:
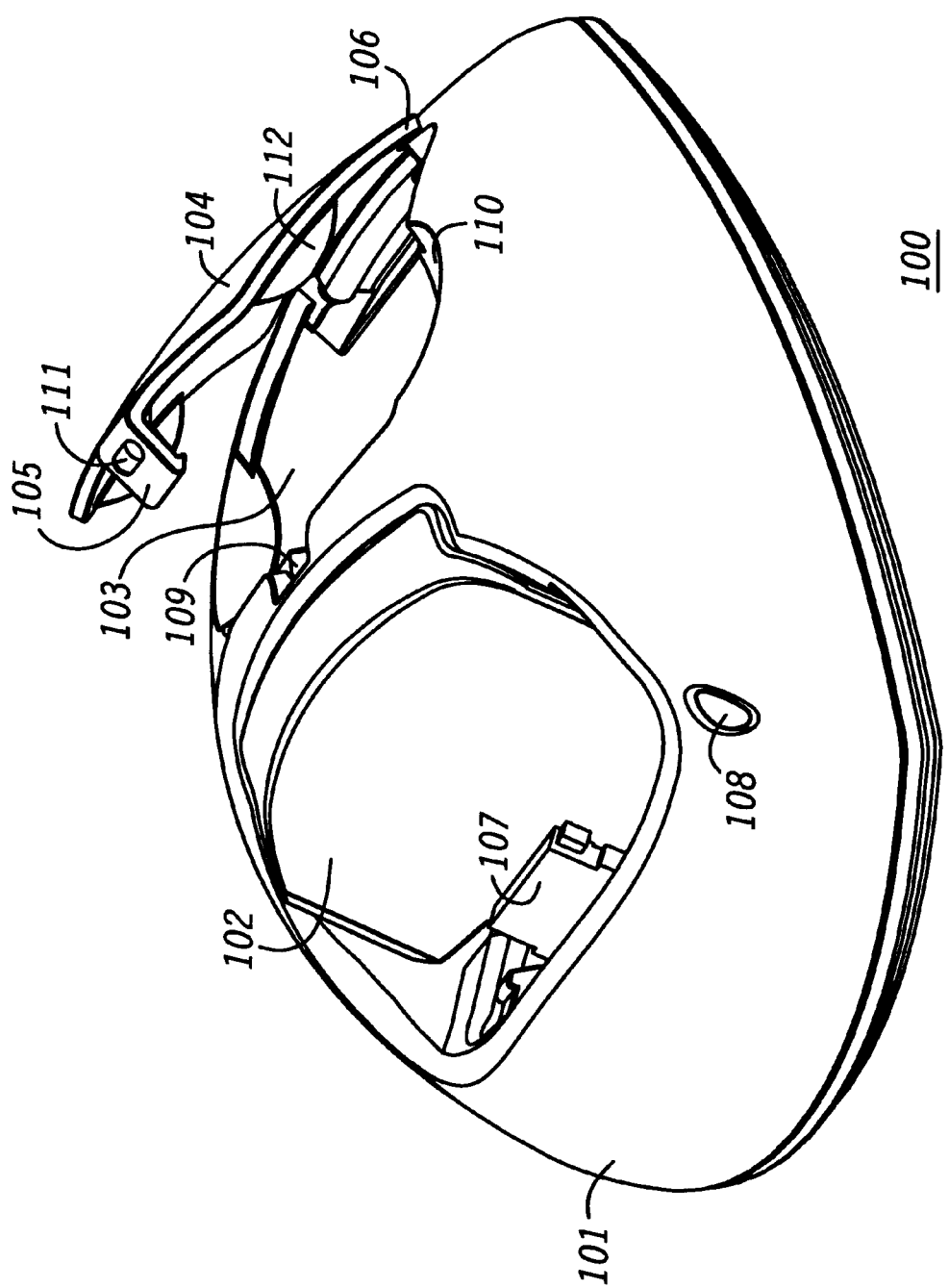
FIG. 1 is an isometric view of a charger with a battery retention door in a semi-open position in accordance with the present invention.

Referring now to FIG. 1, the present invention is illustrated therein. A charger 100 having a door 104 with a retention latch 105 in accordance with the invention is shown. The charger 100 has a front face 101, and a front pocket 102 for charging a phone and battery combination. The front pocket 102 contains a mating contact 107 which mates to the phone. The charger 100 also includes a charging indicator 108 which displays the status of charging.

The rear pocket 103 is for charging a stand alone battery. When not in use, the door 104, which is moveable about a mating pin 106, can be closed to cover the unused pocket. When the door 104 is closed, the retention latch 105 mates with the retention latch recess 109. When the retention latch 105 mates with the retention latch recess 109, a convex detente 111 of the retention latch 105 snaps into place to hold the door 104 shut. The door 104 can be opened by using the finger recesses 110 to grasp the door 104 at the finger grasps 112 and thereby lift it open.

Figure 2:
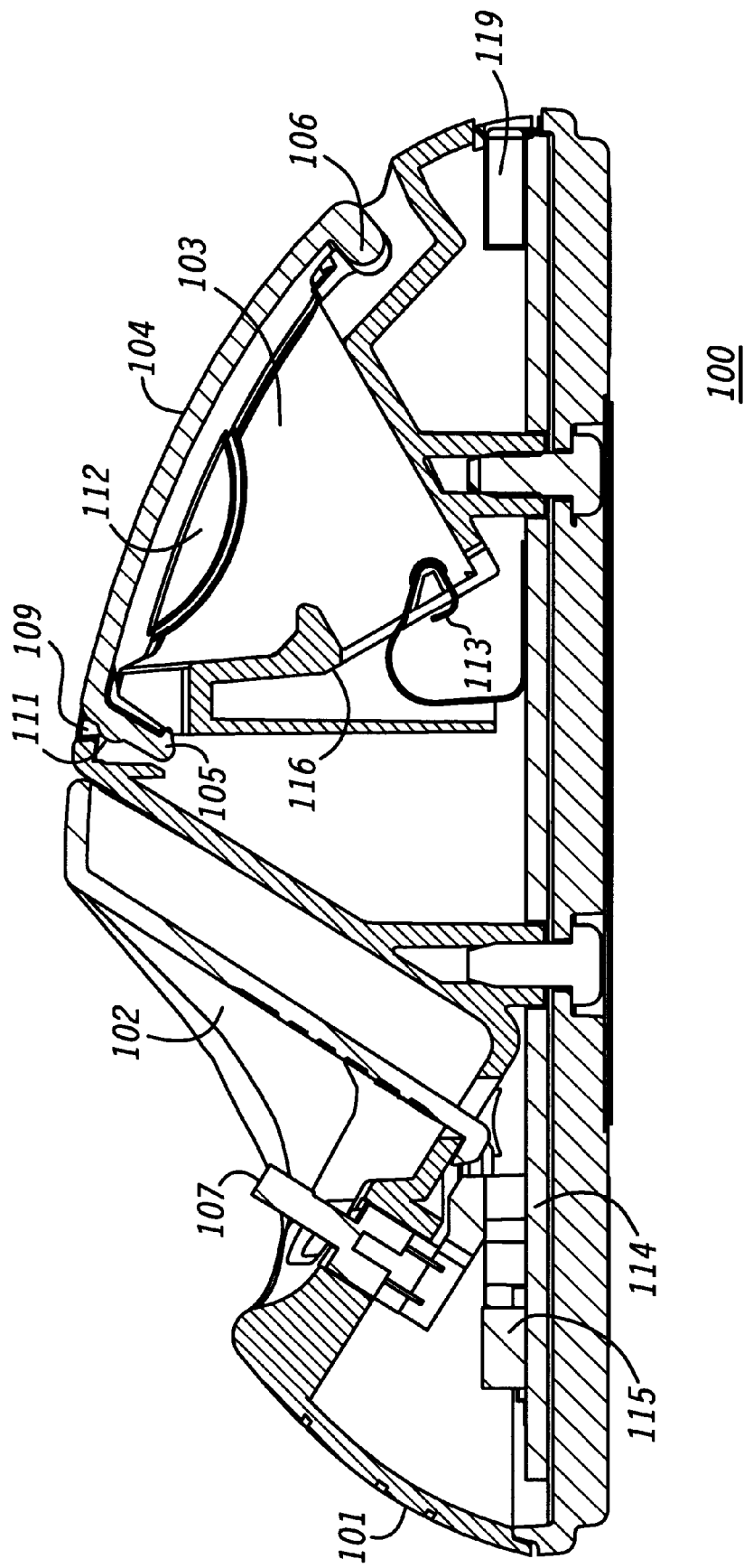
FIG. 2 is a cross sectional view of a charger with a battery retention door in a closed position in accordance with the present invention.

Referring now to FIG. 2, illustrated therein is a cross sectional view of a charger 100 with a door 104 and retention latch 105 in accordance with the invention. In this cross sectional view, the charger 200 has been cut lengthwise to illustrate specific features. For example the door 104 is closed, with the convex detente 111 of the retention latch 105 mating with the retention latch recess 109 located in the charger 100.

In FIG. 2, many of the features illustrated in FIG. 1 may now be seen in more detail. The front pocket 102, with the mating connector 107 can more clearly be seen. Additionally, the finger grasps 112 and the mating pin 106 are again shown.

Note that as FIG. 2 is a cross sectional view, internal components can now be seen. For example, the charger has a printed circuit board 114 upon which electronic components 115 are mounted. The electronic components 115 form a circuit which is capable of charging a battery.

The mating connector 107, for instance, is connected to the circuit board 114. Power to charge a phone is delivered from the power supply connector 119 to the front pocket 102 through the mating connector 107 which receives conditioned power from the components 115 on the circuit board 114.

Similarly, power must be delivered to the rear pocket 103. This is accomplished through an auxiliary set of mating contacts 113 disposed upon the circuit board 114. The auxiliary mating contacts 113 are soldered to the circuit board 114 and then protrude through apertures in the rear pocket wall 116. Thus, when a battery is inserted, electricity is delivered to the auxiliary mating contacts 113.

To use the present invention to charge a battery in the rear pocket 103, a person must first connect the charger to a power supply through the power supply connector 119. The power supply may be of many types, including linear, step down, or flyback. The person next must grasp the finger grasps 112 and open the door 104 of the charger 100. A battery is then inserted so that the terminals of the battery contact the auxiliary mating contacts 113. The battery is then pivoted back, using the auxiliary mating contacts 113 as a fulcrum, until the battery engages with the retention latch 105 of the door 104.

Figure 3:
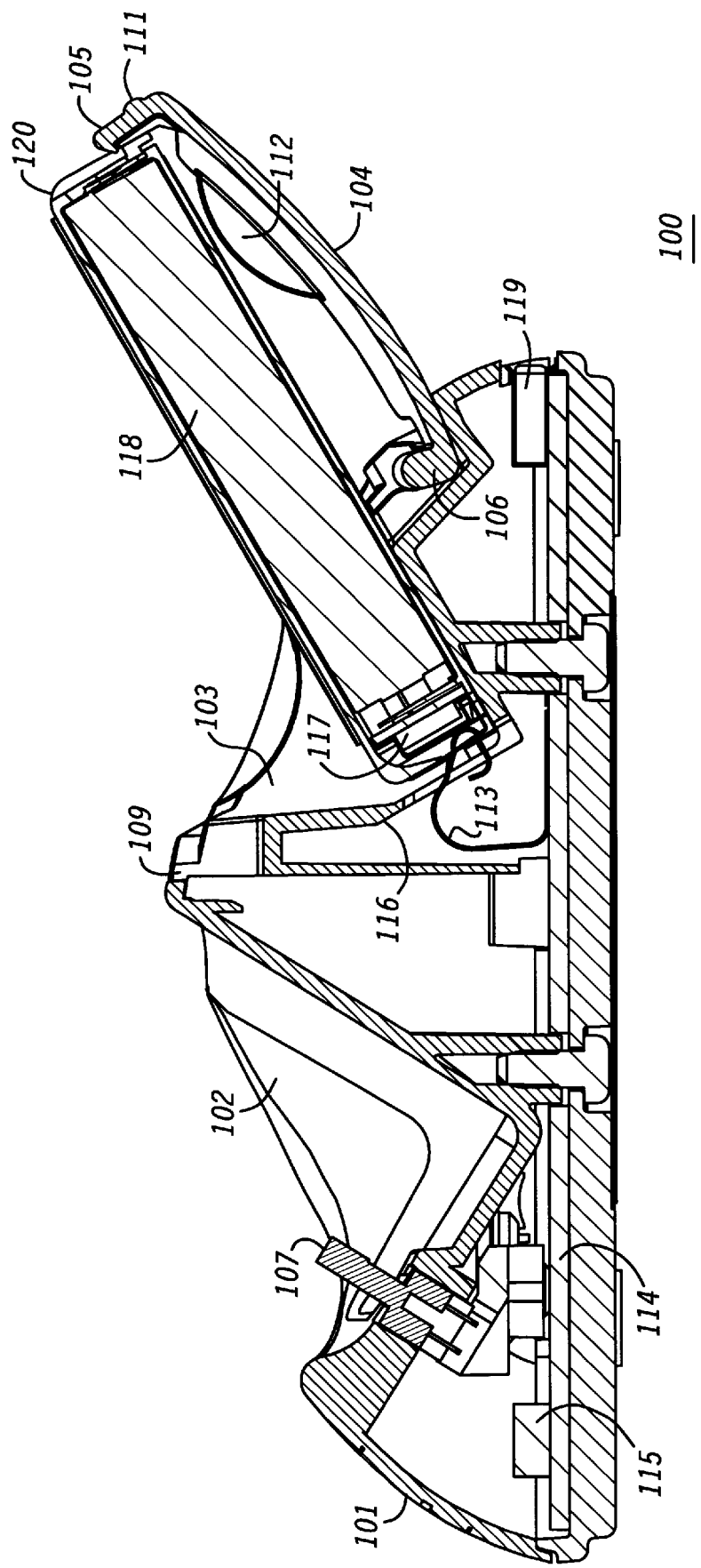
FIG. 3 is a side view of a charger with a battery retention door in the open position, with a battery inserted in the charger, in accordance with the invention.

Referring now to FIG. 3, illustrated therein is a cross sectional view of a charger 100 with a battery 118 inserted per the above instructions. Again, as in FIG. 2, the charger has been cut lengthwise to better illustrate internal parts and details. In FIG. 3, the battery 118 has electrical terminals 117 which contact the auxiliary mating contacts 113. In order to ensure a proper electrical connection, the end 120 of the battery 118 opposite the electrical contacts 117 mates with the retention latch 105. In so doing, the door 104, having a curvature, is slightly bowed. This loading of the door 104 causes the retention latch 105 to exert force upon the battery 118 in a direction towards the auxiliary mating contacts 113. This force holds the electrical terminals 117 of the battery 118 firmly against the auxiliary mating contacts.

Once the battery 118 has finished charging, it is removed by grasping the finger grasps 112 of the door 104 with one hand and the battery 118 with the other. By pulling the door 104 and battery 118 apart, the retention latch 105 disengages from the battery 118. The battery 118 may then be rotated slightly, again using the auxiliary mating contacts 113 as a fulcrum. After slight rotation, the battery 118 may be lifted from the rear pocket 103 and installed in the electronic device in its traditional fashion.

In a preferred embodiment, the charger is constructed of polycarbonate resin using an injection molding process. While plastic is desirable, due to its low cost and high reliability, numerous other materials may be used including metal, fiberglass, styrene and wood. The only requirement for the material is that it be flexible enough to allow the door to bow slightly when a battery is inserted. Additionally, while the preferred embodiment is made by injection molding, due to its low cost and ease of manufacture, numerous other processes including casting and stereolithography will suffice as well.

The advantages of such a charger with a retention door are numerous. First and foremost, by using the present invention, charger designers have the freedom to design chargers which do not require the battery to lay flat. This means that chargers may become more compact. Secondly, when no battery is in the rear pocket, the door may be closed, thereby forming a charger with a smooth contour, as opposed to an exposed empty pocket. Third, the retention latch of the present invention also serves to keep the door shut when no battery is in the rear pocket.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, in a preferred embodiment, the door and retention latch are being applied to a battery charger, the invention could easily be applied to any electronic device with a battery. Further, while the invention has been described as a cover for a rear pocket, a charger or other device may include numerous batteries, pockets, and thus doors. Additionally, while the invention has been described with a pivoting door, the door could be mounted on a slide as well.

What is claimed is:

1. A battery charger comprising a pocket for charging a battery and a door having a battery retention latch for holding a battery in the pocket.

2. The charger of claim 1, further comprising a retention latch recess wherein the retention latch mates with the retention latch recess when the door is closed.

3. The charger of claim 2, wherein the battery retention latch comprises a convex detente.

4. The charger of claim 3, further comprising auxiliary contacts for delivering power to the pocket.

5. The charger of claim 4, wherein the battery retention latch exerts force upon a battery in a direction towards the auxiliary contacts.

6. The charger of claim 5, wherein the door has a curvature.

7. The charger of claim 6, wherein the door is made of one of the materials selected from the group consisting of polycarbonate, plastic, styrene, fiberglass, metal, and wood.

8. The charger of claim 7, wherein the door further comprises finger grasps along the edges of the door.

9. The charger of claim 8, further comprising a second pocket for charging a phone and battery combination.

10. The charger of claim 9, wherein the second pocket further comprises a mating contact for delivering power to the phone and battery combination.

11. The charger of claim 10, further comprising a circuit board having electrical components mounted thereon for delivering power to the auxiliary mating contacts of the pocket and to the mating contacts of the second pocket.

* * * * *

UNITED STATES PATENT AND TRADEMARK OFFICE
CERTIFICATE OF CORRECTION

PATENT NO. : 6,127,802
DATED : October 3, 2000
INVENTOR(S) : Lloyd et al.

It is certified that error appears in the above-identified patent and that said Letters Patent is hereby corrected as shown below:

Abstract,
Line 7, reads "doing the" should be -- doing, the --.
Line 8, reads "enduring" should be -- ensuring --.

Signed and Sealed this

Thirteenth Day of November, 2001

Attest:

NICHOLAS P. GODICI
Attesting Officer *Acting Director of the United States Patent and Trademark Office*